(12) United States Patent
Lawless et al.

(10) Patent No.: US 8,061,892 B2
(45) Date of Patent: Nov. 22, 2011

(54) DEVICES AND METHODS FOR ASSESSING A SAMPLE'S TEMPERATURE EXPOSURE HISTORY

(76) Inventors: John L. Lawless, Pacifica, CA (US);
Robert J. Moffat, Los Altos, CA (US)

( * ) Notice: Subject to any disclaimer, the term of this patent is extended or adjusted under 35 U.S.C. 154(b) by 642 days.

(21) Appl. No.: 12/235,788

(22) Filed: Sep. 23, 2008

(65) Prior Publication Data
US 2010/0074297 A1    Mar. 25, 2010

(51) Int. Cl.
*G01K 11/00* (2006.01)
(52) U.S. Cl. ........................................................ 374/104
(58) Field of Classification Search .................. 374/104, 374/100–103
See application file for complete search history.

(56) References Cited

U.S. PATENT DOCUMENTS

| | | | | |
|---|---|---|---|---|
| 3,839,898 A * | 10/1974 | Talboom et al. | ............... | 374/102 |
| 4,374,328 A * | 2/1983 | Tekippe et al. | ............ | 250/458.1 |
| 4,929,090 A * | 5/1990 | Grahm | .......................... | 374/102 |
| 5,188,457 A * | 2/1993 | O'Hara | .......................... | 374/104 |
| 5,362,568 A * | 11/1994 | Dietz et al. | .................... | 428/421 |
| 5,490,475 A * | 2/1996 | Bryant et al. | .................. | 116/217 |
| 6,968,804 B1 * | 11/2005 | Barbieri et al. | ............... | 116/219 |
| 6,974,249 B1 * | 12/2005 | Fair et al. | ....................... | 374/102 |
| 2002/0110180 A1 * | 8/2002 | Barney et al. | .................. | 374/161 |
| 2006/0256833 A1 * | 11/2006 | Jiang et al. | ......................... | 374/5 |
| 2008/0144699 A1 * | 6/2008 | Plevich et al. | ................. | 374/162 |
| 2008/0187021 A1 * | 8/2008 | Haarer et al. | .................. | 374/102 |
| 2011/0069735 A1 * | 3/2011 | Feist et al. | ..................... | 374/102 |

* cited by examiner

*Primary Examiner* — Christopher Fulton
(74) *Attorney, Agent, or Firm* — Louis L. Wu

(57) ABSTRACT

Device and methods are provided for assessing a temperature exposure history of a sample that is comprised of a nonmetallic material. To assess the temperature exposure history, the pre-exposure and post-exposure electronic states of the sample are compared. Changes in the electronic state of the sample are indicative of the temperature exposure history.

35 Claims, 4 Drawing Sheets

DEVICES AND METHODS FOR ASSESSING A SAMPLE'S TEMPERATURE EXPOSURE HISTORY

STATEMENT REGARDING FEDERALLY SPONSORED RESEARCH OR DEVELOPMENT

This invention was made with Government support under Contract No. F29601-02-C-0137 awarded by the U.S. Air Force. The Government has certain rights in the invention.

BACKGROUND

1. Technical Field

The present invention generally relates to devices and methods for assessing a temperature exposure history of a sample, e.g., the maximum temperature that the sample has attained since the last time it was prepared for use. In particular, the invention relates to such devices and methods that assess the temperature experienced by a nonmetallic sample comprising a nonmetallic material of an optionally disordered and/or multicrystalline microstructure by detecting for changes in the electronic state of the material.

2. Related Art

Various products and components may be damaged when exposed to temperatures above a critical level. For example, in the course of normal operation, turbine blades may be exposed to a wide range of temperatures. Turbine blades may be damaged when exposed to high peak temperatures, but the damage caused by excessive heat may not be readily apparent from casual observation. As turbine blades are often put to use at high speeds, the consequences associated with the blades' failure in operation may be catastrophic. Accordingly, there is a need to determine the temperatures to which such items have been exposed so as to determine whether such items should be replaced. In particular, warrantors and manufacturers of such items are particularly interested in temperature exposure histories to determine whether the items have been exposed to temperatures outside the intended operational temperatures.

Various temperature sensor technologies have been developed to provide an indication of the temperature history of various products and components. For example, indicators have been developed to assess temperatures in experimental internal combustion engines, where conventional methods of temperature measurement were impractical. The indicators employ metals and alloys, which undergo a permanent change in hardness when they are subjected to high temperatures. However, there are a number of disadvantages associated with taking hardness measurements on the indicators to measure the temperature exposure history of the products and parts. For example, hardness measurement are considered destructive or semi-destructive, because once a measurement has been made it cannot be repeated over exactly the same spot. In addition, hardness measurement typically must be done under controlled laboratory conditions.

U.S. Pat. No. 5,735,607 to Shahinpoor et al. describes shape memory alloys having properties that can be useful for use in temperature history sensors. Such alloys can be trained to have a certain shape in its austenitic state or at temperatures above the alloy's austenitic finish temperature. The alloys move in a certain fashion to a second shape, its martensitic state, which is a softer state for the material, when the temperature drops below the austenitic finish temperature and eventually reaches below the martensitic start temperature. The alloys will not return to the martensitic shape without additional external force even if the temperature subsequently falls below the austenitic temperature.

Other known temperature sensors do not generally provide a persistent record of temporary temperature deviations. While conventional temperature sensors such as thermometers or thermocouples provide a continuous indication of the temperature of the material at any particular instant in time, they do not provide a permanent indication of out-of-range temperatures. Instead, such sensors require an additional permanent recording apparatus.

To provide a permanent indication of the temperature history to which an item has been exposed in operation, a temperature sensor may be used to generate electronic temperature signals to a microprocessor/microcontroller (e.g., via an analog-digital converter). In turn, the microcontroller may be used to convert the signals to temperature readings and to store peak temperature data in nonvolatile memory. As described in U.S. Pat. No. 6,377,903 to Weber, such techniques may be applied to a steel rolling mill. Similarly, U.S. Pat. No. 5,025,267 Schofield et al. describes a similar technique for determining the peak temperature of a thermal print head.

One problem with such techniques is that the microcontroller may not be able to withstand the same temperatures as the sensor and must be isolated from the environment whose temperature is being measured by the sensor. That is, the microcontroller may have to be placed in an environment that is, at all times, friendly to electronics associated with the microcontroller. For example, jet engine turbine blades are typically operated at temperatures well in excess of the −40° C. to 85° C. temperature range for proper operation of microcontrollers and associated electronics. Another problem associated with such techniques is that the microcontrollers and accompanying electronics must be continuously powered when in use. Another problem, common to thermocouples, thermistors, and resistance temperature detectors, is that they must be connected to the microcontroller, or to an accessory device, by extension wires which complicate the installation and pose durability problems Optical temperature sensing methods have been developed as well. For example U.S. Pat. No. 4,515,474 to Fox describes optical-fiber systems and methods for determining the most extreme temperature prevailing along the length of an optical-fiber light guide. However, this method suffers from drawbacks similar to those associated with the above-described microcontroller methods.

X-ray diffraction techniques have also been suggested as having utility for measuring the maximum temperature experienced by a single crystal silicon carbide sensor. For example, Volinsky et al. (2004), "Irradiated cubic single crystal SiC as a high temperature sensor," Mat. Res. Soc. Symp. Proc. 792:R5.3.1-R5.3.6, describes single crystal SiC sensors that may be incorporated into gas turbine blades, space shuttle ceramic tiles, automobile engines, etc. The maximum temperature to which the sensor is exposed may be determined by using X-ray diffraction to measure whether radiation-induced strain via neutron bombardment is relieved via annealing and/or whether annealing effects volumetric change.

Luminescence readers have been used to analyze materials that are crystalline and able to store part of the energy imparted to the material by interaction with ionizing radiation. The interaction of ionizing radiation with a nonmetallic material may result in charge-carrier redistribution within the material. Some part of the redistributed charge carrier population may become trapped at defects in the material. The trapped charge carrier may then be released when the material is stimulated via optical or thermal energy. A fraction of the released charge carriers will recombine, which results in luminescence. The intensity of the emitted luminescence is related to the amount of trapped charge carriers that was released by the stimulation. Such a mechanism has been used in "radiation detector badges" worn by personnel in hazardous locations. If the badge has been exposed to ionizing radiation, some part of the charge carrier population will have become trapped. Release of these carriers by thermal or optical interrogation yields a signal that can be interpreted as a measure of the total amount of ionizing radiation to which the badge has been exposed.

Thermoluminescence readers have found use in dating archaeological and geological materials. For example, thermoluminescence dating has been used to date buried objects that have been heated in the past (e.g., pottery). Immediately after heating, the thermoluminescent signature of the object is assumed to be "reset." Since the dose of ionizing radiation accumulated by the object from radioactive elements in the soil, cosmic rays, etc., is proportional to age, the age of the objects may be estimated by dividing the accumulated dose of received radiation received by the assumed dose accumulated per year.

Thermoluminescence technology has also been used in dosimetry applications. In such a case, powders having empty traps are used as a measure of exposure to ionizing radiation. X-ray technicians may use such technologies in the form of exposure badges that incorporate such powders as a safety measure to reduce the chances of being to exposed radiation without the technician's knowledge.

To overcome the drawbacks associated with known technologies for assessing the temperature exposure history of a sample such as, for example, a turbine blade or vane, or combustor liner, or a computer chip or any other piece of equipment, new methods have been discovered that use trapped charges to infer thermal information. In particular, it has been discovered that luminescent technology may be used to assess the temperature exposure history of a sample of a nonmetallic material, e.g., to determine the peak temperature to which the sample has been exposed.

SUMMARY OF THE INVENTION

In a first embodiment, the invention provides a device for assessing a temperature exposure history of a sample that is comprised of a nonmetallic material having a known pre-exposure electronic state. The device includes the sample, optionally held in a sample holder, an energy source for energizing the sample, a detector for detecting any change in an electronic state of the sample, and an analyzer in communication with the detector. The analyzer includes electronic information associated with the known pre-exposure electronic state of the sample and a means for comparing the change in the electronic state of the sample and the electronic information associated with the known pre-exposure state. In operation, the sample is energized by the energy source, e.g., heated. The detector is set up to detect for any change in the electronic state of the sample. The analyzer assesses the temperature exposure history of the sample by comparing the electronic information relating to the known pre-exposure electronic state and any changes detected by the detector.

The invention may be practiced with different samples with different known pre-exposure electronic states. For example, the sample may involve one or more traps having one or more energy levels between the material's valance and conduction bands. When a plurality of traps is involved, the traps may have varying electronic energy levels between the material's valance and conduction bands and different thermal-release rates. Typically, the known pre-exposure electronic state is associated with some, many, most or substantially all traps being filled partially or fully.

The sample may be comprised of different compounds, e.g., a chalcogen and/or halogen containing compounds. Suitable compounds include, e.g., LiF, $CaF_2$, $CaSO_4$, $ZrO_2$, $Y_2O_3$, $TiO_2$, $SiO_2$, $Al_2O_3$, BeO, MgO, $Li_2B_4O_7$ and $MgB_4O_7$ and $Y_2O_3$. Different crystallographic structures may be possible for a suitable compound. For example, monoclinic, tetragonal, or cubic $ZrO_2$ may exhibit different bandgaps. The compounds may be doped with at least one dopant selected to form a trap of a desired electronic energy level and desired thermal-release parameters.

The sample may have different constructions. For example, the sample may be of a unitary construction or comprise a plurality of parts. Samples with unitary construction include parts of turbines and semiconductors items, e.g., microelectronic devices. The samples may be formed in bulk or coated, locally or entirely with the nonmetallic material. The samples may also be formed from a combination of different material, e.g., a bulk metallic material with the nonmetallic material as an inclusion, inlay, insert, plug or the like.

Any of number energy sources, detectors and analyzers may be used. Typically, a heater is used as an energy source. Exemplary energy sources that employ radiative heating include lasers and laser diodes. Conductive and/or convective heater may be used as well. Suitable detectors include, for example, luminescence, conductivity and microstructural phase change detectors. The analyzer may be effective to provide an indication of a peak temperature experienced by the sample, and the electronic information associated with the known pre-exposure electronic state is from a direct measurement on the sample in the pre-exposure state. Optionally, electronic information is associated with the known pre-exposure electronic state associated with the sample unbombarded by neutrons and/or independent of the sample's volume.

In another embodiment, the invention provides a method for preparing a sample so as to allow for assessment of its temperature exposure history after preparation. A sample is provided that comprises a nonmetallic material of an optionally disordered and/or multicrystalline microstructure and having a known pre-exposure electronic state associated with at least one nonempty trap of an electronic energy level between the material's valance and conduction bands. The at least one trap may be filled partially or fully by using ionizing radiation such as ultraviolet, x-ray, and/or nuclear radiation. Once the at least one trap is filled, the sample may be exposed to a temperature history that may be analyzed via detection of any change in the electronic state of the sample.

Provided in a further embodiment is a method for assessing a temperature exposure history of a sample that may or may not be carried out using the inventive device. The method involves providing a sample that comprises a nonmetallic material. This may be done using the inventive method described above. Also provided is electronic information relating to the known pre-exposure electronic state. The sample is then exposed to a temperature history that may change the sample's electronic state and then energized. As the sample is energized, the sample's electronic state may change and be detected in a manner that is coordinated to account for the rate of change for the sample's electronic state. Any such change in the sample's electronic state is compared with the electronic information so as to assess the temperature exposure history of the sample.

Additional embodiments of the invention will be apparent from the disclosure contained herein.

DETAILED DESCRIPTION OF THE INVENTION

Definitions and Overview

Figure 1:
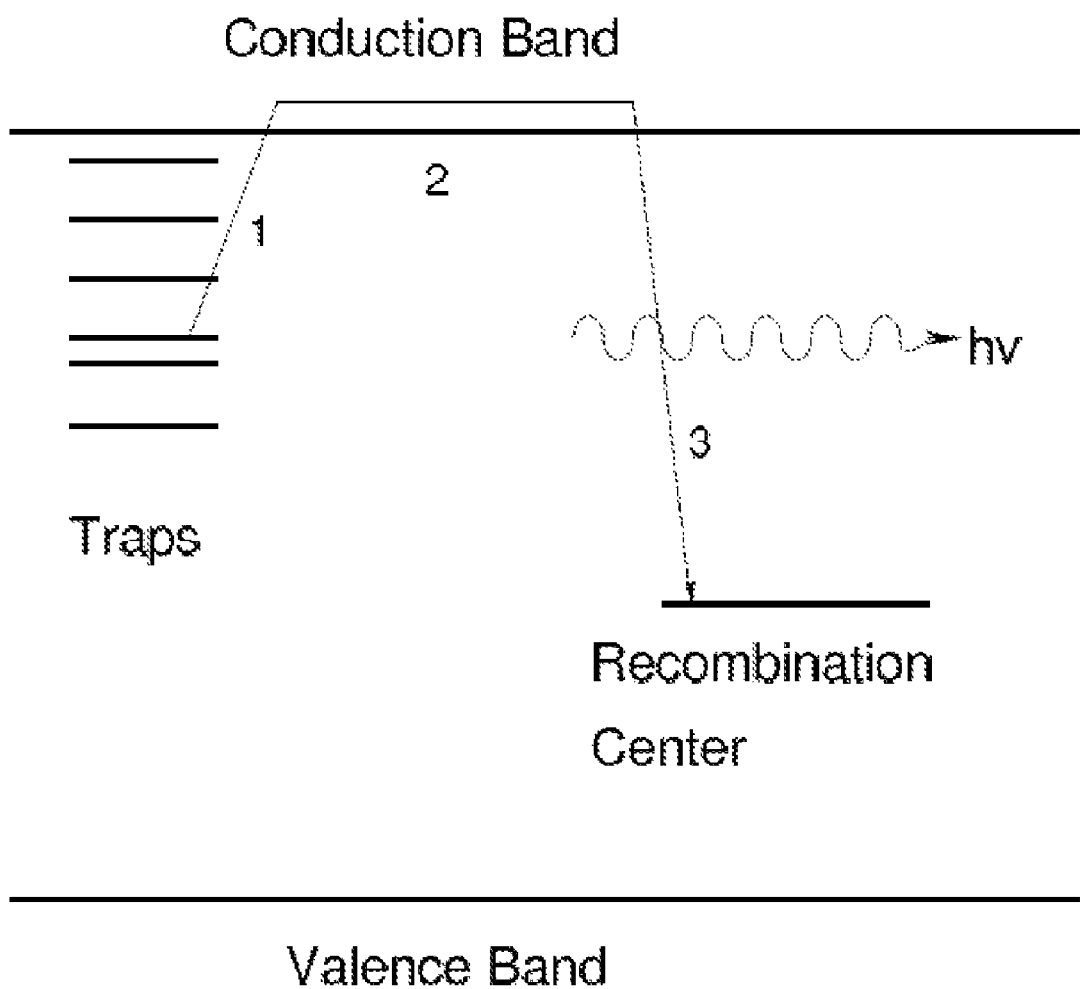
FIG. 1 is a graphical depiction of a conceptualized energy level diagram for a nonmetallic band structure having a plurality of traps and luminescent behavior thereof.

Before describing the invention in detail, it must be noted that, as used in this specification and the appended claims, the singular forms "a," "an," and "the" include plural referents unless the context clearly dictates otherwise. Thus, for example, reference to "a charge-carrier trap" includes one or more charge-carrier traps, reference to "a trap-releasing temperature" includes a single trap-releasing temperature as well as a range of trap-releasing temperatures and the like.

In describing and claiming the present invention, the following terminology will be used in accordance with the definitions set out below.

The term "band" as used herein in its ordinary solid-state physic sense and refer to a range of very closely spaced electronic energy levels in solids, the distribution and nature of which determine the electronic properties of a material. For example, the term "valence band" refers to electronic states with the highest range of electron energies that are normally filled with electrons at absolute zero. In contrast, the "conduction band" is the next upper band of allowed electronic states which are normally empty at absolute zero. Charge carriers in the conduction band are free to move about the material. For nonmetallic materials, the valence and conduction bands are distinct and separated by a bandgap. In an idealized model associated with a defect-free single-crystalline material, no energy state exists within the bandgap. In practice, however, no material is perfect. As discussed in greater detail below, the valence and conduction bands in nonmetallic materials such as semiconductor and insulators are separated by a bandgap in which traps may lie.

The term "electronic" as used herein refers to matter that involves charge carriers such as electrons or holes.

The terms "substantial" or "substantially" as in "substantially all traps being filled" refer to an electronic state in which all or nearly all traps are filled or at least nonempty. The terms "substantial" and "substantially" are used analogously in other contexts involving an analogous definition.

The term "temperature exposure history" refers to the temperature conditions to which a material has experienced. The term encompasses factors such as the peak temperature, duration of exposure at or near the peak, etc.

The term "trap" refers to locations having an intermediate energy state between the valence and conduction bands of a nonmetallic material. For crystalline materials, the traps typically correspond to imperfections such impurities, dislocations, grain boundaries, etc.

The term "unitary" as in "a sample of a unitary construction" is used in its ordinary sense and refers to a sample that is provided in a single piece rather than in two or more pieces. A particulate sample comprising more than one particle is not considered a unitary sample.

In general, the invention pertains to a device and methods for assessing a temperature exposure history of a sample that is comprised of a nonmetallic material. The device includes a sample optionally held in a holder, an energy source for energizing the sample, a detector for detecting any change in an electronic state of the sample, and an analyzer in communication with the detector. To assess the temperature exposure history, the pre-exposure and post-exposure electronic states of the sample are compared. Changes in the electronic state of the sample are indicative of the temperature exposure history.

In some instances, the pre-exposure electronic state may be "pre-set." For example, a sample of an unknown electronic state may be exposed to ionizing radiation of a predetermined dose sufficient to fill at least some charge-carrier traps between the material's valence and conduction bands. Then, the sample is heated to unknown or uncertain temperatures. To determine the temperature the sample to which the sample has been exposed, the sample may be reheated. As luminescent radiation is emitted when traps are emptied, the presence of luminescence indicates the traps of the sample had previously not been emptied. Similarly, the absence of luminescence indicated that traps of the sample had previously been emptied. Thus, one may deduce the previously known or uncertain temperature that the sample had previously attained by taking note of the luminescence of the sample relative to the temperatures to which it is reheated.

Thermal Exposure History and Luminescence

To fully elucidate the novelty and nonobviousness of the invention, a brief discussion of the relationship between thermal exposure history and luminescence is warranted. As shown in FIG. 1, nonmetallic materials such as semiconductors and insulators generally have electrons in (nearly) filled valence bands. Such materials also have a conduction band where the electron population is very low. Intermediate locations ('traps') between the conduction and valence bands may capture charge carriers such as electrons or holes. The traps are generally assumed to correspond to impurities, e.g., dopants and crystal defects such as dislocations and grain boundaries.

As shown in FIG. 1, trapped electrons exhibit a higher energy state than electrons in the valance band. Nonmetallic materials such fluorites and other mineral substances store energy when exposed to ionizing energy, e.g., ultraviolet, x-ray, cosmic ray, and nuclear (alpha, beta, gamma) radiation. That is, electrons may be captured by the traps. Depending on the trap, the electrons may remain captured for years, centuries, or millennia. That is, the electron release rate may be low at a particular thermal state. There are also analogous traps which capture holes and hold them for long periods of times. The discussion of electrons in electron-type traps that follows also applies to the analogous behavior of holes in hole-type traps.

Subsequently, stored energy may be released in the form of light when the material is energized, e.g., heated or optically stimulated. That is, electrons in a trap may be stimulated such that they jump temporarily into the conduction band before falling to a lower energy state, e.g., a recombination center. As shown in FIG. 1, it is believed that released electrons recombine with holes at recombination centers to result in luminescence. It is further theorized that luminescence intensity relates to the quantity of electrons that fall into a lower energy state.

Figure 2:
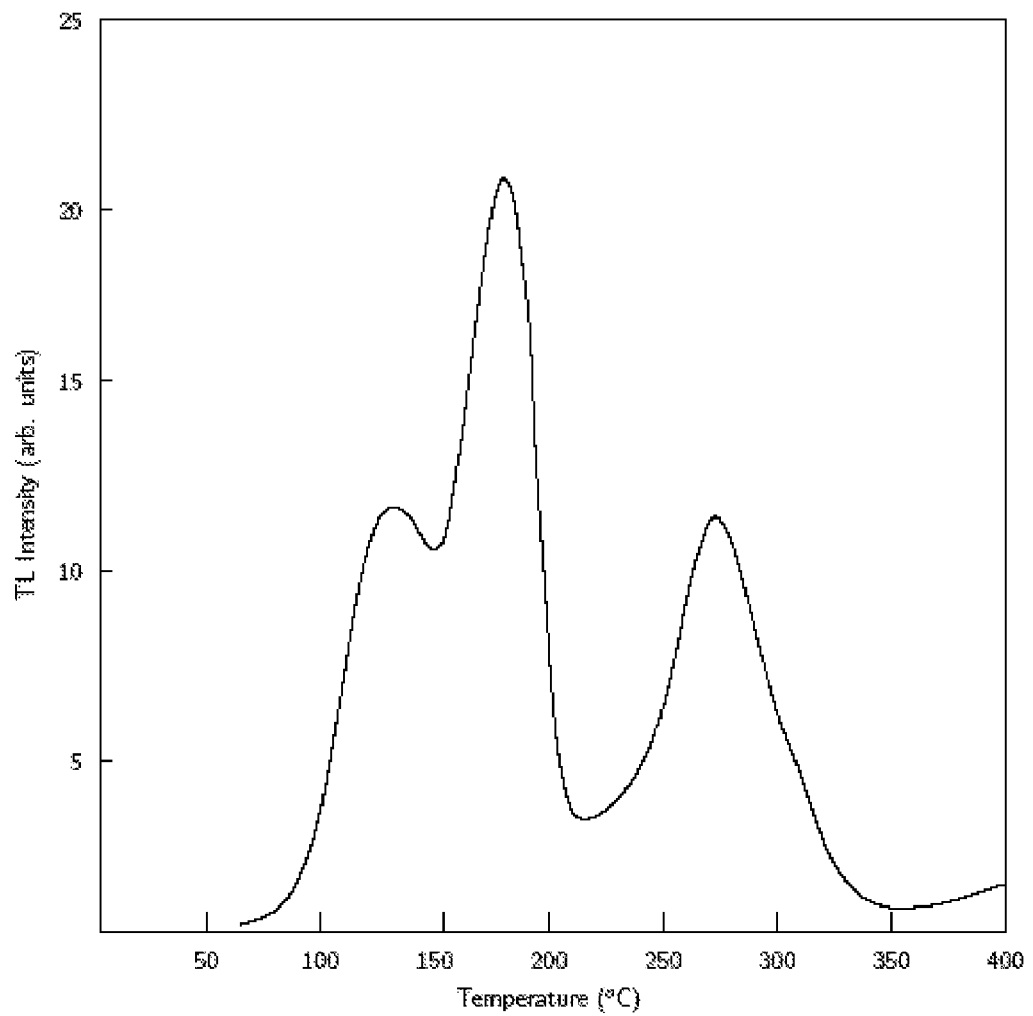
FIG. 2 is a graph that plots the intensity of photonic emissions from an ionized sample of calcium fluoride heated at a temperature increased at a rate of 10° C. versus temperature.

Calcium fluoride, for example, is a well known thermoluminescent material that may emit light when heated. For example, FIG. 2 is a plot of light intensity emitted by a sample of calcium fluoride having a plurality of filled traps that empties as the sample is heated. The traps are filled by exposing the sample to 1-Gray radiation, and the sample is then heated at a constant rate of 10° C./s. Light intensity is plotted against temperature. As shown, the temperature versus radiation intensity curve for the sample exhibits various peaks. Each different peak generally corresponds to the release of electrons (or holes) from a different trap.

Figure 4:
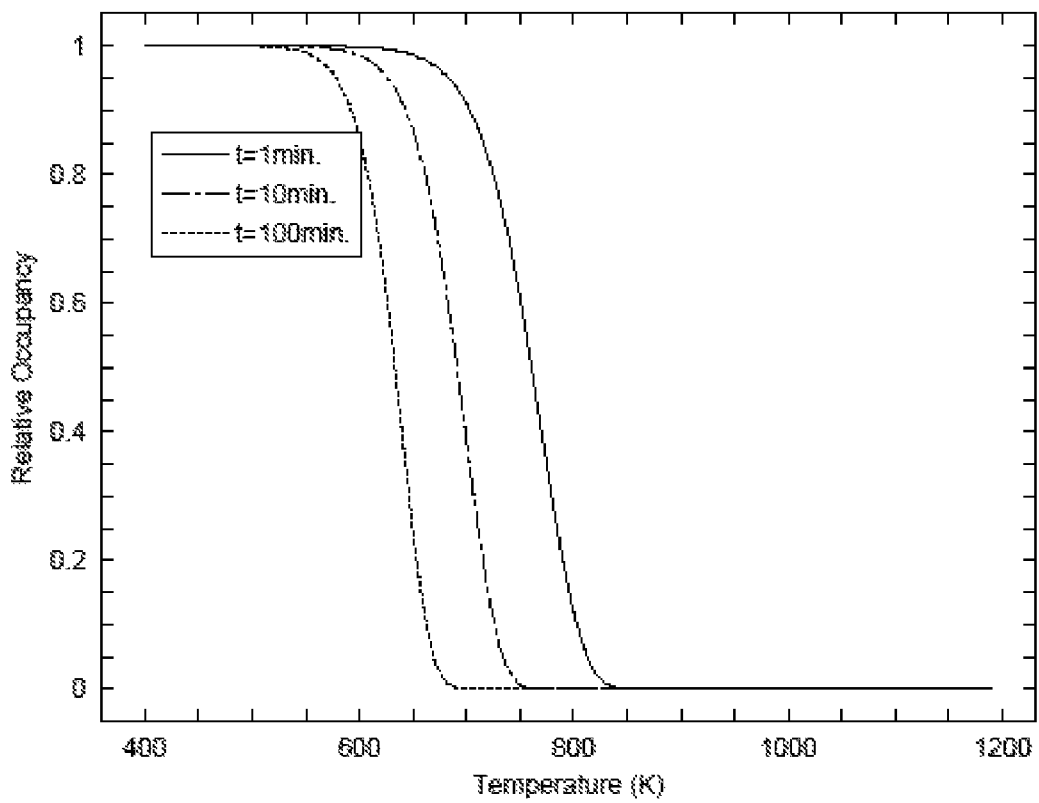
FIG. 4 is a graph that plots the relative occupancy of electrons traps after exposure to temperatures for three different exposure times.

As a material is heated, the electrons and holes may leave their traps through thermal excitation. The rate constant for this thermal emptying at some temperature T is usually modeled as $se^{(-E/kT)}$ where E is the trap's activation energy, s is constant associated with the trap, and k is Boltzmann's constant. As an example, the behavior of a trap that has E=1.5 eV and $s=10^8$ per second and negligible retrapping of freed electrons, is shown in FIG. 4 which shows what fraction of the electrons in the trap remain after exposure to the temperature (X-axis) for three different exposure times: 1 minute, 10 minutes, and 100 minutes. If exposure temperatures are below 600 Kelvin, most electrons remain in this trap but if the temperature reaches 800 K or higher, most electrons have emptied from this trap. Because different traps can have widely varying combinations of s and E, different traps respond differently to temperature.

Figure 3:
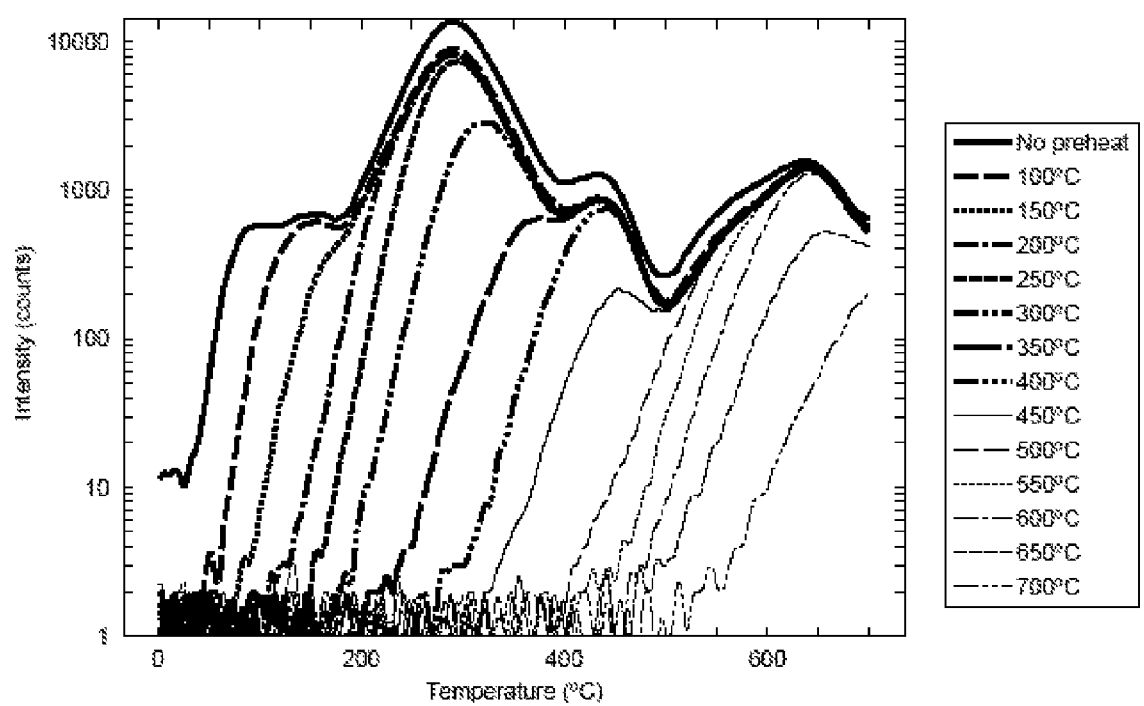
FIG. 3 is a graph that plots the emission curves for a sample of CaSO4:Dy, irradiated with 10-Gray radiation, exposed to various peak temperatures, cooled, and re-heated at a constant rate.

As an example, a sample of dysprosium-doped calcium sulfate (CaSO4:Dy) was exposed to 10-gray of radiation and then its glow curve was recorded. This is the top curve in FIG. 3. The same material was later exposed to the same 10-gray dose but then heated to 100° C. after which it was allowed to cooled back to room temperature. A thermoluminescence glow curve was then obtained from this sample and is marked as the 100° C. curve in FIG. 3. This was repeated for various peak exposure temperatures ranging from 150° C. to 700° C. in 50° C. increments to produce the associated glow curves as shown in FIG. 3. As shown, the glow curves record the peak temperature that the sample experienced. Each trap whose E and s values were associated with temperatures below the peak temperature was emptied during the exposure, and emissions from those traps are consequently absent from the associated glow curve for that experiment.

In short, a nonmetallic material effectively "records" the temperature history in this invention. If a sample, e.g., a turbine blade having a nonmetallic coating, is irradiated to fill all coating traps and the sample is exposed to a given temperature, then all traps in the coating with lower characteristic temperatures will be emptied. However, traps with higher characteristic temperatures will remain full. By comparing trap populations of the coating before and after heating, one may determine the peak temperature to which the sample has been exposed.

Exemplary Inventive Method and Device

As briefly discussed above, the invention involves comparing the electronic states of the sample before and after exposure to an unknown or uncertain temperature history. The pre-exposure electronic state may be measured or set to known occupancy levels. The post-exposure electronic state is determined through a deductive process. After exposure to an unknown or uncertain temperature history, the sample may be energized, e.g., via heating, to interrogate the electronic state of the material. Such interrogation may result in a response (or lack thereof) consistent with the sample's temperature exposure history. For example, the response (or the absence thereof) may provide an indication as to the peak temperature to which the sample has been exposed. As discussed below, the invention may also be used to determine the time to which the sample has been exposed to the peak temperature.

The invention may be practiced on any sample as long as the sample includes a nonmetallic material. In some instances, substantially the entirety of the sample is formed from the nonmetallic material. However, the invention may be used to assess the temperature history of a sample that is partially or mostly metallic as long as the sample also includes the nonmetallic material, and the nonmetallic material is exposed to substantially the same temperature history as the metallic material. For example, the invention may be practiced using a metallic sample having a nonmetallic coating. In essence, the electronic state of nonmetallic material reflects the temperature history to which the material has been exposed.

Certain compounds are well suited as a luminescent indicator material that provides a detectable indication of the temperature history to which the sample has been exposed. For example, compounds formed from a chalcogen and/or halogen are often used in luminescent dosimetry applications. Suitable oxides and halides for use with the invention include, for example, LiF, $CaF_2$, $CaSO_4$, $ZrO_2$, $Y_2O_3$, $TiO_2$, $SiO_2$, $Al_2O_3$, BeO, MgO, $Li_2B_4O_7$ and $MgB_4O_7$ and $Y_2O_3$. Such compounds may exhibit different crystal structures. For example, the invention may be used with samples containing monoclinic, tetragonal, and/or cubic $ZrO_2$. In some instances, the compound may include one or more dopants selected to form a trap of a desired electronic energy level and a desired charge-carrier releasing temperature.

Typically, the known pre-exposure electronic state of the nonmetallic material is associated with at least one nonempty trap of an electronic energy level between the material's valance and conduction bands. For samples formed from nonmetallic materials with empty traps, sample may be prepared by filling at least one trap and/or substantially all traps of the material. This typically involves exposing the material to ionizing radiation such that electrons or other carriers in the valence band are elevated to traps having an energy level lower than that of the conduction band. Depending on the material used, ultraviolet, x-ray, and/or nuclear radiation, e.g., alpha, beta, and/or gamma radiation may serve to fill traps.

Once the sample's electronic state is known, the sample is ready for exposure to a temperature history. The pre-exposure electronic state serves a "baseline" measurement that may be used as a basis for comparison relative to the post-exposure electronic state of the sample. Any changes in the electronic state of the sample will provide an indication of the temperature or temperatures to which the sample has been exposed.

To determine the post-exposure electronic state of the sample, the sample is energized in a manner that allows for detection of any changes in the electronic state of the sample. Typically, the sample is energized through heating. Heating may be carried out via a number of means, e.g., radiative, convective, and/or conductive heating means. Suitable source of radiative sample heating include lasers and laser diodes.

The invention also involves detecting for any change in the electronic state of the sample. Depending on the sample and the energy source different types of detectors may be used. For example, a luminescence detector may be used to monitor for changes in the electronic state of the sample associated with photonic emissions. In addition or in the alternative, the detector may monitor changes in conductivity, optical absorption, electron spin resonance, or microstructural phase differences in the material. The energy source and the detector may be operated in a coordinated manner.

The different components of the inventive device may be constructed for various applications, as discussed below. In general, the inventive device includes an energy source, a detector, and an analyzer. Optionally, a sample holder may be provided having a construction that accommodates the physical characteristics of the samples. In some instances, the energy source and/or the detector may converge on localized regions of the sample for assessing local temperature exposure histories. For example, the device may be provided in a handheld form to allow a user to spot check local temperature exposure histories. In the alternative, the energy source and detector may be positioned to allow for a plurality of samples of a substantially identical construction to be assessed in substantially the same manner. In any case, the analyzer is typically placed in communication with the detector and contains electronic information associated with the known pre-exposure electronic state. That way, the analyzer may be used to assess the temperature exposure history of the sample by comparing the change in the electronic state of the sample and the electronic information associated with the known pre-exposure state.

Applications of the Invention

From the above discussion, it should be apparent that the invention has numerous uses and applications. For example, the invention may find widespread applicability in the non-destructive inspection of engine components, e.g., turbine blades, vanes, or portions of combustion chambers. These components may be damaged by exposure to temperatures higher than their design limit. Thus, as a part of routine maintenance, engines are periodically taken apart and inspected to determine whether any components require replacement due to damage from overheating. Unlike traditional methods for determining the peak temperatures to which the components may have been exposed during service, the present invention does not require machining or metal removal.

The invention may also have applicability in the electronics industry. For example, manufacturers of components such as central processor units (CPU) and graphics processor units (GPU) often specify maximum operating temperatures for such items to avoid damage. Warrantees may be voided should such specified temperatures be exceeded. Although CPUs and GPUs typically contain temperature detectors that record the maximum temperature to which the processor units are exposed, the records may be "erased" by unscrupulous users. Thus, the invention provides a means for proving that the part had been exposed to an excessively high temperature.

Notably, the invention is not limited to any particular location of sample. This is particularly suited for samples having a unitary construction but with localized regions that may be heated to different temperatures. For example, such samples may be exposed to unknown or uncertain temperature conditions. One may carry out the invention by successively or simultaneously energizing each of the localized regions to determine whether they were exposed to different peak temperatures or by appropriately imaging the entire surface of the sample while the sample is being heated.

Furthermore, the invention does not require destructive analytical techniques. For example certain analytical techniques require holes to be drilled into a sample under analysis. Similarly, analytical techniques that use hardness testing procedures often result in indentations to be imprinted into a sample under analysis. Such techniques may thereby weaken the sample under analysis by introducing localized stresses. Perversely, such techniques may cause a sample to fail when the sample may not have failed without undergoing such techniques.

Variations on the Invention

In general, the disclosure above pertains to trap occupancy methods (TOM). For example, as described above a material may be (a) irradiated so as to (partially) fill, to a known degree, one or more traps, (b) placed in service at unknown temperatures, and (c) energized so as to interrogate the trap occupancy levels, which are then analyzed to determine peak temperature information. In other words, peak temperature information may be inferred from changes in the degree of trap occupancy.

Alternative or additionally, peak temperature information may be inferred from changes in the total concentrations of such traps. Such an inference can be made because, at elevated temperatures, some materials undergo crystal rearrangements, possibly as caused by impurity migration or chemical changes, or other factors. These rearrangements may remove or create traps, or may alter the structure of traps in the material.

Thus, the invention also relates to total trap population methods (TTPM). To infer peak temperature information from changes in the total trap concentrations, one may: (a) irradiate a material; (b) energize the material and record pre-service data; (c) place the material in service, exposing the material to unknown temperatures; (d) irradiate the material again; (e) interrogate the material and record post-service data, and (f) compare the pre-service and post-service data. By using prior experimental data, models, or empirical information in the comparison of pre-service and post-service data, peak temperature information relating to the conditions to which the material as exposed during service can be inferred.

The TTPM can be combined with the TOM. For example, one may: (a) irradiate the material, (b) interrogate the material and record baseline data, (c) irradiate the material again to (partially) fill the traps, (d) place the material in service, exposing the material to unknown temperatures, (e) interrogate the material and record post-service data that reflects the trap occupancy after service, (f) irradiate the material again, (g) interrogate the material and record calibration data, and (h) compare the baseline data with the post service data and the calibration data. By using prior experimental data, models, or empirical information in the comparison of baseline, post-service, and calibration data, peak temperature information relating to the conditions to which the material as exposed during service can be inferred.

It will be apparent to those of ordinary skill in the art that the invention may be embodied in various forms. For example, regardless of how the electronic state of a material changes, thermoluminescence (also known as thermally stimulated luminescence or TSL) techniques may be used to assess for changes in the electronic state of a material by monitoring for luminescence while heating the sample. Typically, temperature is increased at a constant rate. Such techniques have been used as a standard dosimetry method associated with LiF-based radiation safety badges that employees might wear at nuclear facilities.

In addition or in the alternative, thermally stimulated conductivity (TSC) techniques may be used. Such techniques typically involve monitoring a sample's conductivity as the sample is heated. When electrons are released from traps, the sample's conductivity is increased. Such techniques allow for the interrogation of materials that are covered by optically opaque materials.

Similarly, optically stimulated luminescence (OSL) techniques may be used. Traps of certain materials may be emptied by upon exposure of light of an appropriate wavelength. For example, quartz, when illuminated with red light may result in a blue emission associated with trap emptying. Similarly, certain aluminum-oxide-based radiation badges for dosimetry applications operate under this general technique. Of course, this technique requires that the material be protected from light of a trap-emptying wavelength during normal operation.

Furthermore, electron spin resonance (ESR) techniques may be employed. Sometimes, electrons caught in traps are in unpaired orbitals. The combination of magnetic fields and microwaves can cause their spin to flip. ESR techniques may involve exposing the sample to a magnetic field and observing for the absorption or omission of RF waves.

Another suitable detection technique involves the observation of electrical breakdown through the application of direct or alternating current. Furthermore, those of ordinary skill in the art may recognize the detectability of changes in dielectric constants due to the presence of substantial numbers of electrons/holes in traps. Such changes may be detectable, for example, by capacitance, X-ray scattering, IR-spectra, or other methods.

Additional variations of the present invention will be apparent to those of ordinary skill in the art. For example, traps associated with a sample's electronic state may not be instantaneously emptied as the sample is heated. Instead, the trap-emptying rate may be associated with certain activation energies and exhibit an exponential growth rate as a function of temperature. In some instances, this phenomenon tracks thermal damage behavior.

Moreover, when there is more than one trap having an energy level that corresponds to the range of temperature of interest, the traps may be associated with different activation energies. As a result, the traps may be emptied to differing degrees even though the traps have been exposed to the same temperature history. From this, mathematical models may be developed to assess not only the peak temperature that a sample has been exposed to but also the amount of time the sample was exposed to the peak temperature. Upon routine experimentation, those skilled in the art may find that the mathematics of such modeling may be derived from first principles and/or based on empirical measurements.

Furthermore, one way in which warrantors and manufacturers interested in determining whether the samples have been exposed to excessively high temperatures may heat the sample to a high temperature within the warranty limit, maintain the sample at that temperature, and simultaneously monitor luminescence activity. When held at the constant temperature, traps of differing activation temperatures for emptying may exhibit exponential behavior associated with different time constants. The decay curve can then be analyzed to infer trap populations without having to exceed the warranty limit.

It is to be understood that while the invention has been described in conjunction with the preferred specific embodiments thereof, that the foregoing description is intended to illustrate and not limit the scope of the invention. Aspects of different embodiments of the invention may be included or excluded from other embodiment. Other aspects, advantages and modifications within the scope of the invention will be apparent to those skilled in the art to which the invention pertains.

All patents mentioned herein are hereby incorporated by reference in their entireties to an extent not inconsistent with the above.

What is claimed is:

1. A device for assessing a temperature exposure history of a sample, comprising:
   a sample comprising a nonmetallic material having a known pre-exposure electronic state;
   an energy source for energizing the sample;
   a detector for detecting a change in the electronic state of the sample in response to being energized by the energy source; and
   an analyzer in communication with the detector, comprising
      electronic information associated with the known pre-exposure electronic state,
      a means for comparing the change in the electronic state of the sample and the electronic information associated with the known pre-exposure state so as to assess the temperature exposure history of the sample.

2. The device of claim 1, wherein the known pre-exposure electronic state is associated with one or more traps of an electronic energy level between the material's valance and conduction bands.

3. The device of claim 1, wherein the known pre-exposure electronic state is associated with a plurality of traps of varying electronic energy levels between the material's valance and conduction bands.

4. The device of claim 2, wherein the sample has a unitary construction.

5. The device of claim 4, wherein the unitary sample is a part of a turbine.

6. The device of claim 4, wherein the unitary sample includes a semiconductor.

7. The device of claim 1, wherein the sample comprises a compound formed from a chalcogen and/or halogen.

8. The device of claim 7, wherein the compound comprises LiF, $CaF_2$, $CaSO_4$, $ZrO_2$, $Y_2O_3$, $TiO_2$, $SiO_2$, $Al_2O_3$, BeO, MgO, $Li_2B_4O_7$ and $MgB_4O_7$ and $Y_2O_3$.

9. The device of claim 8, wherein the compound is monoclinic, tetragonal, or cubic $ZrO_2$.

10. The device of claim 7, wherein the compound further includes at least one dopant selected to form a trap of a desired electronic energy.

11. The device of claim 2, wherein the known pre-exposure electronic state is associated with substantially all traps being nonempty.

12. The device of claim 1, wherein the energy source is a convective or conductive heater.

13. The device of claim 1, wherein the energy source is a source of infrared or optical radiation.

14. The device of claim 1, wherein the energy source is a source of magnetic and/or RF fields.

15. The device of claim 1, wherein the energy source is a source of infrared or optical radiation for electronic excitation.

16. The device of claim 1, wherein the detector is a luminescence detector effective to monitor any change in the electronic state of the sample associated with photonic emissions in response to sample energizing.

17. The device of claim 1, wherein the detector is effective to monitor any change in the electronic state of the sample associated with conductivity differences produced in response to sample energizing.

18. The device of claim 1, wherein the detector is effective to monitor any change in the electronic state of the sample associated with microstructural phase differences in response to sample energizing.

19. The device of claim 1, wherein the analyzer is effective to provide an indication of a peak temperature experienced by the sample.

20. The device of claim 1, wherein the electronic information associated with the known pre-exposure electronic state is from a direct measurement the sample in the pre-exposure state.

21. The device of claim 1, wherein the electronic information associated with the known pre-exposure electronic state associated with the sample unbombarded by neutrons.

22. The device of claim 1, wherein the electronic information is independent of the sample's volume.

23. A method for assessing a temperature exposure history of a sample, comprising:
 (a) providing
  (a1) a sample that comprises a nonmetallic material having a known pre-exposure electronic state, and
  (a2) electronic information associated with the known pre-exposure electronic state;
 (b) exposing the sample to an temperature history that may change the sample's electronic state;
 (c) energizing the sample;
 (d) detecting any change in the electronic state of the sample in response to being energized; and
 (e) comparing the electronic information associated with the known pre-exposure electronic state with any change in the electronic state of the sample so as to assess the temperature exposure history of the sample.

24. The method of claim 23, wherein step (a) comprises coating the sample with the nonmetallic material.

25. The method of claim 23, wherein step (a) comprises filling partially or fully at least one trap between the material's valence and conduction bands.

26. The method of claim 25, wherein the at least one trap is filled via ionizing radiation.

27. The method of claim 26, wherein the ionizing radiation is selected from ultraviolet, x-ray, and/or nuclear radiation.

28. The method of claim 25, wherein steps (c) and (d) are coordinated to account for release of one or electrons from at least one trap of an electronic energy level between the material's valance and conduction bands.

29. The method of claim 23, step (e) is carried out to determine the peak temperature experienced by the sample.

30. The method of claim 29, wherein step (e) is carried out to determine the duration of peak temperature experienced by the sample.

31. The method of claim 23, wherein step (d) is carried out using a technique that involves TSL, TSC, OSL, ESR, and/or IR or visible spectra analysis.

32. The method of claim 23, wherein
 step (a) comprises filling partially or fully at least one trap between the material's valence and conduction bands to produce electronic information associated with the known pre-exposure electronic state,
 step (b) comprises placing the sample in service at unknown temperatures,
 step (d) is carried out to interrogate any changes in trap occupancy levels, and
 step (e) is carried out to determine the peak temperature to which the sample was exposed in step (b), thereby effecting a trap occupancy method.

33. The method of claim 23, wherein
 step (a) comprises irradiating the material, energizing the material and record pre-service data to produce electronic information associated with the known pre-exposure electronic state,
 step (b) comprises placing the sample in service at unknown temperatures,
 step (c) irradiating the material,
 step (d) is carried out to interrogate any changes in total trap population and
 step (e) is carried out to determined the peak temperature to which the sample was exposed in step (b), thereby effecting a total trap population method.

34. The method of claim 33, carried out in a manner that includes a trap occupancy method.

35. A method for preparing a sample so as to allow for assessment of its temperature exposure history after preparation, comprising:
 (a) providing a sample that comprises a nonmetallic material having an electronic state associated with at least one trap of an electronic energy level between valance and conduction bands of the material;
 (b) ionizing the material so as to fill the at least one trap partially or fully so as to render known the electronic state of the material; and
 (c) allowing the sample to be energized so as to allow the sample to be analyzed via detection of any change in the electronic state of the material.

* * * * *